Dec. 12, 1961 R. T. VAUGHAN 3,012,921

CONTROLLED JET ETCHING OF SEMI-CONDUCTOR UNITS

Filed Aug. 20, 1958 2 Sheets-Sheet 1

INVENTOR.
ROBERT T. VAUGHAN
BY
F. D. Prager
ATTORNEY

INVENTOR.
ROBERT T. VAUGHAN
BY
F. D. Rogers
ATTORNEY

United States Patent Office 3,012,921
Patented Dec. 12, 1961

3,012,921
CONTROLLED JET ETCHING OF SEMI-CONDUCTOR UNITS

Robert T. Vaughan, Cheltenham, Pa., assignor to Philco Corporation, Philadelphia, Pa., a corporation of Pennsylvania Filed Aug. 20, 1958, Ser. No. 756,192
1 Claim. (Cl. 156—17)

Figure 1:
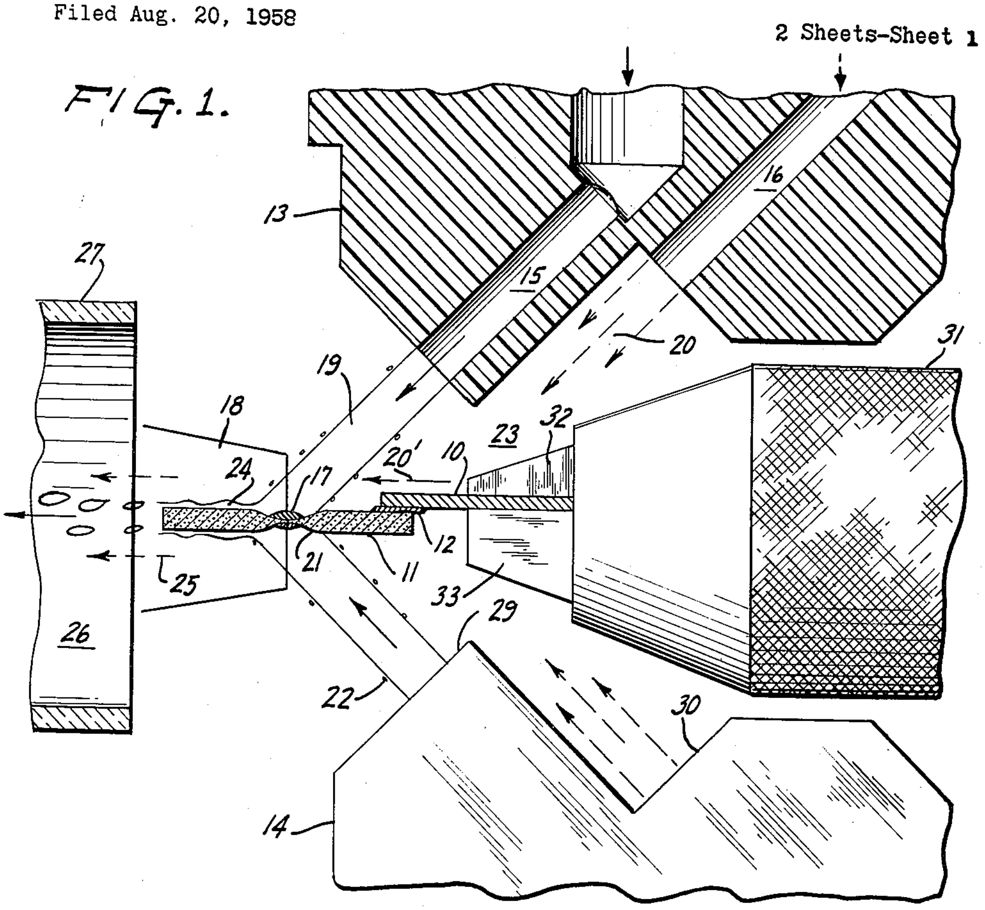

This invention relates to a method of fabricating semiconductor diodes, transistors and similar electrical units and to apparatus for such fabrication. The invention is particularly concerned with, although not limited to, the cleaning treatment or so-called "clean-up" etching which is frequently necessary pursuant to other fabricating operations on transistors, that is, after formation of emitter and/or collector electrodes and attachment of electrode connectors and base members, or so-called tabs.

Acid or caustic liquids have been used for said clean-up etching, at various degrees of strength and temperature and either with or without electrolytic action. Difficulties have, however, been encountered, one of these having to do with the fact that etching fluids must safely contact certain semiconductor electrode areas, but must be positively prevented from contacting closely adjacent base tab areas. This difficulty is formidable because of a variety of associated problems, some of which will be discussed more fully hereinafter and which include among others, the fact that the involved areas, both that to be etched and that to be protected from the etch, must be extremely small and must be disposed in extremely close proximity to one another. Typical distances from areas to be etched to areas to be protected from the etch are of the order of small fractions of a millimeter.

Another problem has been that large numbers of said units are fabricated and that the periods of time, consumed for purposes of clean-up etching, have been excessive. Most serious however has been the economic loss caused by the fact that extreme manual skill and dexterity is required for adequate performance of the clean-up etching and that nevertheless, destruction of proper characteristics, caused by faulty clean-up etching, has been unavoidable in the case of many of the semiconductor units prepared.

These known problems have now been found to have been aggravated by the fact that a dipping operation has thus far been used for the clean-up etch. In said operation, a microscope was kept focused upon a small surface area of a pool of etching solution. The operator held the semiconductor blank in a vertical plane, by means of a holding tool engaging the tab, and brought the so held blank into the focus of the microscope. He or she then cautiously dipped the blank into the pool, to an extent just sufficient to completely cover the minute electrode or electrodes and the directly surrounding annular areas (which require etching), but so as to safely avoid coverage by the solution of the directly adjacent base tab and solder areas (which must be protected from etch). The operator tried to keep the blank immersed in this exact position, for an exactly determined period of time (to allow adequate etching), prior to rapid removal of the blank from the etching pool and immediate, complete, rapid immersion thereof in a washing, etch-removing and atmosphere-excluding bath (to prevent renewed contamination of the blank). Evidently, even the slightest amount of operator fatigue is likely to cause inadequate and/or excessive immersion of portions of the diminutive bodies involved. Normally imperceptible, but microscopically substantial, vibrations of the hand are more than likely to occur, and to cause a complete "reject."

It has been virtually impossible, thus far, to alleviate these conditions, for instance by the use of more or less obvious guide or jig members for applying positional control to the semiconductor blanks, or by automatic equipment. The surface level and surface tension of the pool of etchant, as well as other process factors, are too changeable for this purpose. Thus the dipping operation has been just barely feasible for laboratory workers highly specialized in microscopic and micromanipulative work, working for very short periods of time and with the utmost of steadiness of manual control.

The problem is very serious, since it must be expected that semi-conductor-electrode-base units of ever smaller dimensions will be in demand. This is particularly so in a large field wherein it is important to maintain certain desirable, electronic characteristics of such units, including cut-off current ($I_{C0}$), collector resistance ($R_c$) and common emitter current gain (beta). Such characteristics depend vitally on elimination of so-called "recombination," around the emitter electrode, and so-called "leakage," around the collector electrode, all of which in turn is known to require the definite absence of any particle—in fact, the absence of any molecule or atom—of contaminating metal, vapor, liquid and the like, from a narrow annular region surrounding each electrode. At the same time, related characteristics such as intrinsic base resistance ($R_b'$) are dependent on closeness of the base connection to the emitter electrode.

It has therefore been a primary object of this invention to avoid the difficulties referred to and to make the clean-up etching operation easier, less critical, less dependent on extreme manual skill, and less subject to trouble due to fatigue, while maintaining, or if possible improving, the general efficiency of the clean-up treatments thus far available.

This was found to be possible and, surprisingly, it was achieved by using a system of rapidly moving jets of fluid, in lieu of the conventional static pool of etchant. In other industries, jet applications and dipping treatments are generally considered as being equivalent to one another, and in very small work, where high accuracy of limitation of small fluid contact areas is important, masking and dipping methods have actually been preferred over the application of a dynamic jet. In the case of semiconductors, however, the opposite has been found to apply.

It has even been found that by means of jet treatment the entire clean-up etch can be performed more rapidly, as well as more accurately than by dipping treatment. This is so not only because the new jet method, as indicated, permits greater freedom in manipulation of small parts, but also for the further reason that a flowing jet removes waste products of etching more rapidly than they are dispersed in a static pool.

Still further it is a most advantageous result of the new type of treatment that it allows etching of a single electrode area, or different etching treatments of two such areas, in a semiconductor unit having a pair of such areas opposite one another. In the dipping method, this was inherently impossible, except when resorting to masking expedients; and those in turn have involved greater trouble than benefit, in the present field, due to occluded vapor particles and the like.

The highly advantageous and unusual results of the new method are traceable, at least in large part, to the feature that according to this invention the application of a special, protective gas current has been combined with the use of suitably dimensioned and applied liquid flows. Although considerable care is still required for proper performance of the new method, and also in the manufacture and use of apparatus for applying this method—it being necessary for instance in such apparatus to provide very special forms and adjustments of nozzle units in order to afford sufficient space for transistor holders, electrode connectors and the like—very substantial advantages have nevertheless been obtained by the combined liquid jet and gas currents, characterizing the invention. For instance, such operating care as is still required can successfully be provided by operators of less unique skill, and during longer periods of manual operation, by means of the new invention; and during such periods, increased numbers of units can be treated with adequate success. In fact the operation has been simplified to the point where it can readily be automated.

Figure 3:
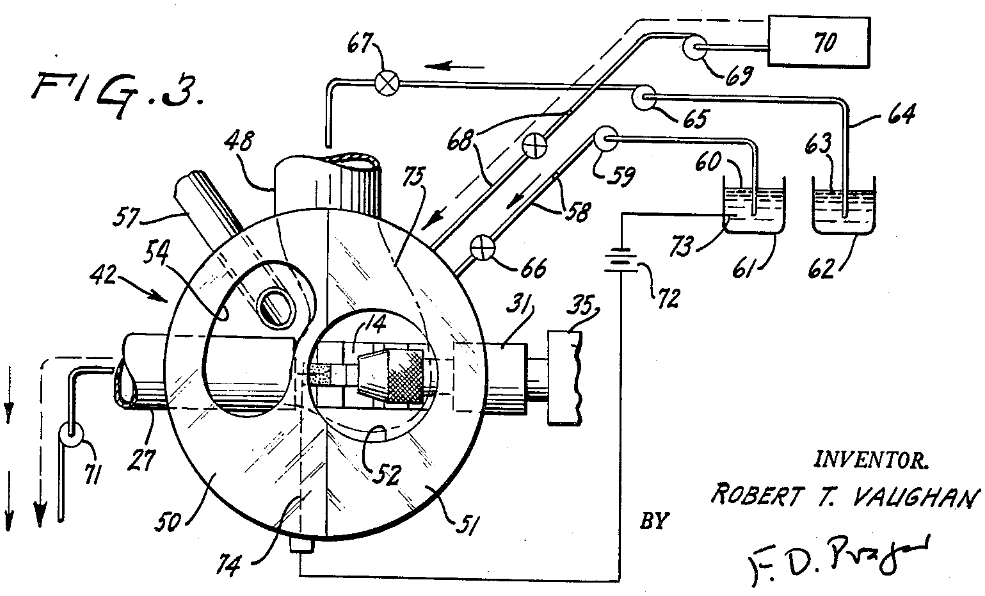

The invention will be understood more completely from a study of the detailed description of a preferred embodiment of the new apparatus, which description will also disclose one of the possible ways of carrying out the new method. This description follows, with reference to FIGURE 1 which is a greatly enlarged elevational view, partly in section, of the new apparatus, shown in actual operation. FIGURE 2 is a view of such apparatus, taken on a smaller but still enlarged scale and showing associated elements and devices. FIGURE 3 is a partly schematic view of such apparatus, taken along line 3—3 in FIGURE 2, on a still smaller scale, and showing certain additional associated elements and devices, while omitting a portion of the elements or devices shown in the other views.

Figure 2:
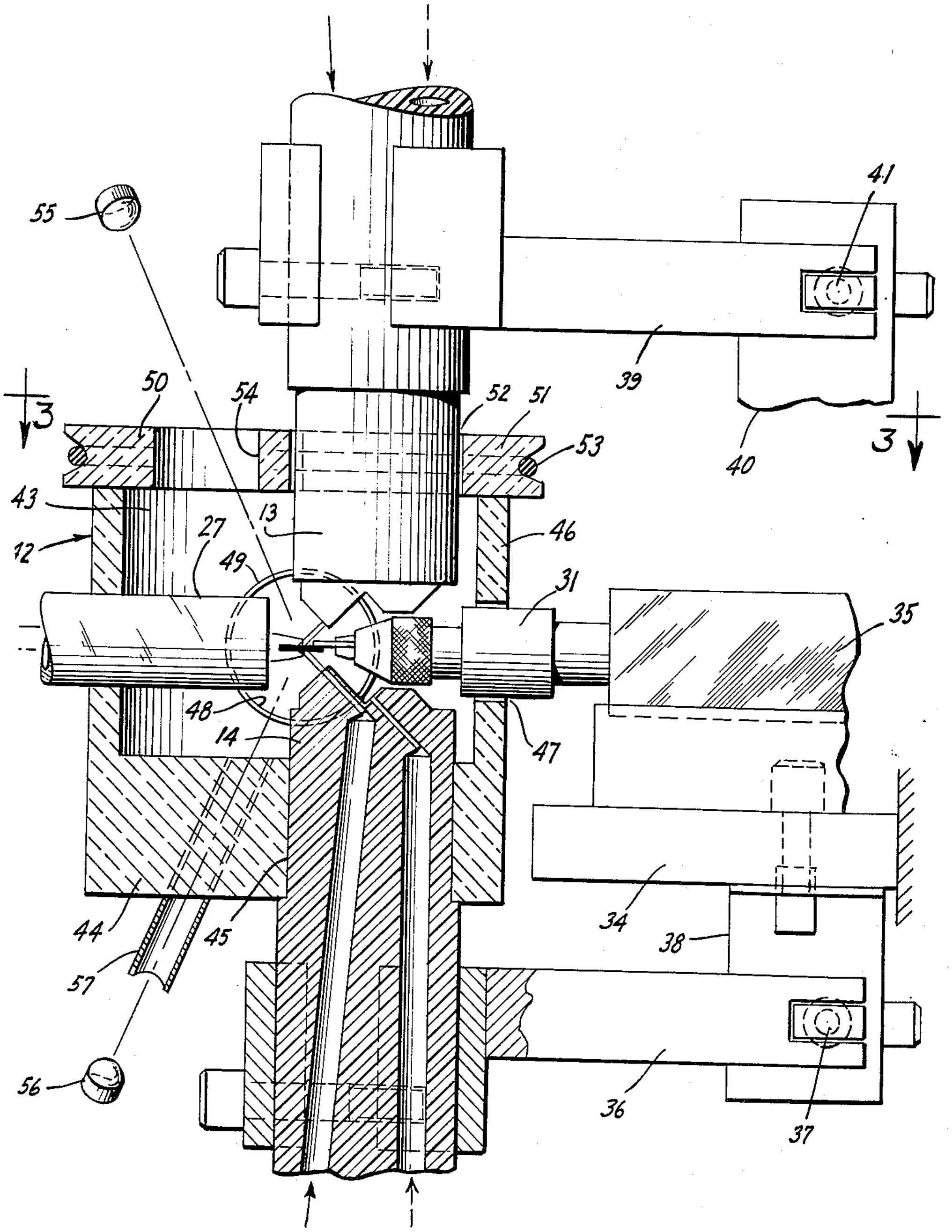

Referring first to FIGURE 1: base tab 10 is secured to an edge area of semiconductor wafer 11 by solder 12; and it may immediately be noted that it is due to the diversity of materials used at 10, 11 and 12 that the basic problems have arisen which are solved by the present invention. As already indicated, they have been solved by the combined applications of liquid jets to portions of wafer 11 and of gas currents to said wafer and to elements 10 and 12.

For such purposes, tab 10 and wafer 11 are horizontally supported between, and closely adjacent to, upper and lower jet nozzle units 13, 14. Each nozzle unit constitutes an integral combination of means forming liquid and gas passages, and each liquid passage, 15, extends in an oblique direction, bypassing tab and solder areas 10, 12, and leading to a central portion of wafer 11. Each gas passage 16 extends in an oblique direction, generally across the surface of wafer 11 and pointing toward tab and solder areas 10, 12 at the edge of wafer 11. Centrally of the wafer, an electrode 17 has previously been formed and a whisker wire 18 connected therewith; and jet columns 19, containing liquid etchant and ejected from passages 15, are aimed directly toward said central position, while streams 20 of gas, such as dry air, are so ejected from passages 16 as to reach the central portions via the aforementioned "edge and base tab areas," as indicated at 20'. Fluid to form said columns and streams is supplied to each of the respective passages 15, 16 under positive pressure. It will be shown hereinafter that a flowing body of liquid etchant, without admixture of gas, is supplied to nozzle passage 15, which accordingly forms a coherent liquid jet column 19, and that even the possibility of forming isolated liquid spray particles 22 (detached from the surface of this coherent liquid column incident to the rapid flow of the column) is minimized. As already mentioned, the jet column flows rapidly; it is discharged at a velocity, relative to that of the gas current, such that the gas current neither deflects the flowing liquid column itself nor changes the form thereof. The gas current is however maintained and directed to entrain and remove vapor and mist, arising from the liquid column, as will be described hereinafter.

By means of these combined liquid jets and currents of gas, several results are obtained. In the first place, rapidly moving etching liquid, under positive pressure, is forcibly contacted with narrow, annular, central semiconductor areas 21 forming part of the "electrode areas" containing electrodes 17. This causes removal of foreign matter which is likely to be present in such areas pursuant to previous treatments. At the same time the liquid is safely prevented from contact with base tab and solder areas 10, 12, as is equally required to avoid redeposition of foreign matter. Even minute liquid particles or droplets 22 or particles of vapor, which may be present in the ambient atmosphere or may emanate or tear loose from jet column 19, are positively driven away from the base tab and solder areas, no matter how close the latter areas may be to the electrode areas. The apparent reason is that such gas streams maintain a slightly super-atmospheric pressure in an air cushion zone 23 into which they enter and which is disposed over edge and base tab areas 10, 12 and in back of central jet impingement areas 21. The base tab areas and the exposed solder therein, both on top and on bottom of wafer 11, are thus kept dry, while both center areas 21 are kept wet with flowing etchant.

The so-established dryness of the base tab and solder areas is known to be a feature of the utmost importance, second only to the positive clean-up etching of the so-called "recombination" and "leakage" zones, provided by areas 21. Deleterious materials initially present are forcibly removed from the latter zones, and no undesired redeposition of base tab or solder materials is allowed. Such prevention of redeposition is required wherever successful semiconductor units are desired, particularly if they shall be capable of exacting service. For reasons which need not be discussed herein, the blank may be a slice of a crystal consisting of germanium, silicon or the like, with electrodes formed of metals such as indium or aluminum. The base tab on the other hand is made of metallic materials, comprising nickel, molybdenum or the like; and the solder attaching this tab to the semiconductor must contain elements such as tin, gold, antimony or the like. If any amount of corrosive and aggressive etching agent, such as the usual acid or caustic liquid, either dilute or concentrated, hot or cold, with or without electrolytic action, were allowed to contact said base metals, during the clean-up etch, and then to reach the semiconductive edge of the electrode area, the purposes of the etching treatment would be substantially vitiated or destroyed, as atoms of highly deleterious metals would thus be carried to the electrode, "recombination" or "leakage" areas.

Nor would it be possible in any satisfactory way to avoid such difficulties by application of masking layers or the like to the base tab area, as already mentioned, or, as a further alternate, to postpone the attachment of the base tab metal until after a conventional clean-up by dipping or other procedures. This was among the reasons why the initially described, critical dipping treatment, applied by highly skilled operators, has thus far constituted the best answer available; and it was recognized that it was a necessary rather than a satisfactory answer. All of these problems and complexities, however, are substantially eliminated by the new process as outlined.

Desirably, spent liquid 24 as well as spent air 25, having passed from ducts 15, 16 across wafer 11 or portions thereof, is collected in a suction zone 26, maintained within a suction nozzle or pipe 27, said pipe opening opposite said ducts and extending away therefrom in line with the general directions of liquid and gas currents 19, 20.

It is to be noted that, although such application of suction has a number of advantages, including the fact that it assists the motion of liquid and gas employed in accordance with the invention, nevertheless this use of suction cannot replace the above described discharge of fluid under positive pressure, particularly not the discharge of gas or air stream 20 under positive pressure. The reason for this latter point is that gas current 20, discharged under positive pressure into the atmosphere, can be directed at will, and particularly so as to maintain relatively high air pressure in a properly located air cushion 23, thereby preventing liquid 19 and humidity 22 from contacting base tab and solder areas 10, 12. The application of suction, opposite fluid inlets 15, 16, is beneficial in several respects, including the fact that it counteracts undesirable accumulations of droplets or drops of liquid on wafer 11, in cases where jets 19 are very thin. However, the suction as such creates a relatively undirected, more or less diffuse flow of gas into the suction nozzle; for this reason, even a very large and powerful suction nozzle or system of such nozzles would not positively and safely control the directions in which vapor or humidity 22 can drift about the jet columns, unless it also caused jets 19 to vibrate undesirably. By contrast, the positively directed air flow 20, used in accordance with the invention, protects the base tab areas while allowing liquid jet columns 19 to proceed substantially as directed.

As further shown in FIGURE 1, the nozzle units containing liquid and gas discharge passages 15, 16 are advantageously arranged so as to minimize the length of the exposed liquid jet columns 19 and thereby to minimize the possibility of spray particles 22 being formed or enlarged, which particles might conceivably, by their weight and inertial forces, overcome the force of protective air currents 20. Accordingly, nozzle units 13, 14 have discharge areas 29 of oblique liquid passages 15 closely spaced above one another. By contrast, discharge areas 30 of gas passages 16, behind these liquid nozzles 29, are desirably spaced from one another by a greater distance allowing insertion of a chuck member 31 therebetween, this chuck member holding tab 10 by suitable clamps 32, 33. It will thus be noted that terminal portions of nozzle units 13, 14 have a peculiar profile resembling that of upper and lower jaws, with a pair of front members 29 resembling incisors and a pair of back members 30 resembling molars, while chuck 31 and tab and wafer unit 10, 11 thereon are interposed between such teeth in the approximate way of a tongue. Incidentally, it is possible to orient the chuck and nozzle unit in various ways other than shown and described, for instance to hold blank 11 in a vertical plane. It is also possible to use different numbers of liquid and gas nozzles, to change the angularities of liquid and/or gas jets relative to the wafer, and to change the arrangement in many other ways.

The structure employed to establish proper register between rigid parts and fluid currents is shown, with further associated details, in FIGURE 2. A rigid supporting plate 34 has a holder 35 for chuck 31 suitably mounted thereon, thus providing a stable support and reference location for the semiconductor blank. Lower jet nozzle unit 14 is adjustably secured to rigid plate 34 by linkage 36, 37, 38 the details of which need not be shown and which suitably allows the nozzle unit to be moved along any of the three dimensions of space and also to be rotated about its own vertical axis, so that in effect both lower fluid columns can be adjusted independently, relative to support 34 and blank 11. Similar, independently adjustable mounting 39, 40, 41 is provided for upper nozzle unit 13. By means of such upper and lower mounting members it is possible not only to aim the center lines of both liquid jet columns precisely toward the coaxially disposed centers of upper and lower electrodes, but also to maintain adjust and readjust proper orientations of the gas currents, as may be required for instance because of the use of different wafer and tab designs.

Discharge portions of jet nozzle units 13, 14, together with directly adjacent parts, are surrounded by a container structure 42 which forms a chamber 43 having a bottom 44 press-fitted onto lower nozzle unit 14, as generally shown at 45. The side wall, 46, of this chamber or vessel has relatively loose fit with chuck or holder 31, 35, at 47. Opposite the chuck holder the aforementioned vacuum nozzle and pipe 27 is fitted into side wall 46. Between portions 27 and 47 an additional, relatively large pipe 48 is screwed into said wall 46, at 49, to discharge water into chamber 43 for purposes to be mentioned hereinafter. The top of vessel 42 is formed by semi-circular, apertured closure members 50, 51 loosely surrounding upper jet nozzle unit 13 at 52 in order to allow independent motion of such unit, the members 50, 51 being held together by an O-ring 53.

It will be further noted that an aperture 54 is provided in top member 50, in line between the semiconductor wafer and the objective 55 of a microscope, provided for supervision of the adjustment of upper liquid jet 19 relative to the upper electrode and whisker. When such adjustment has been established, similar supervision is provided for lower liquid jet 19, relative to the lower electrode, by microscope objective 56, aimed at wafer 11 through a tube 57, fitted into bottom 44 and also usable as a drain. In order that upper and lower nozzle adjustments may not interfere with one another, upper nozzle unit 13 may be shifted bodily by linkage 39, 40, 41 and relative to support 34 and wafer 11, whereas lower unit 14 may be rotated about its own axis, by linkage 36, 37, 38.

The effect of such adjustments, particularly of the lower nozzle unit, will become particularly clear from consideration of FIGURE 3, wherein upper nozzle unit 13 has been removed from aperture 52 to show the semiconductor wafer and lower nozzle unit 14. This figure also indicates that the liquid passages of jet nozzle units 13, 14 are connected, by ducts 58, to the discharge of a pump 59 for liquid etchant, thereby providing for the formation of the coherent liquid column 19. The suction of this pump is connected to a supply of etchant 60 in a container 61. A further container 62 holds a supply 63 of purified water, connected by duct 64 to the suction of a pump 65 which discharges to water inlet 48 of chamber 43. Valves 66, 67 are interposed between the pumps and the liquid inlets of vessel 42, in order to properly regulate and time the liquid flows. The gas discharge passages of the nozzle units are connected by duct 68 to the discharge of an air pump 69, the suction of which communicates with a suitable source 70 of dry, purified air. Suction passage 27, connected to vessel 42, forms the inlet of a pump 71, adapted to move air and liquid.

In operation, if electrolytic clean-up etching is employed, as is preferred in certain cases, a suitable source 72 of electrical current is connected to electrolyte liquid 60 by electrode 73 and to the semiconductor whiskers by suitable whisker connectors schematically shown at 74. However, it is possible in many cases and preferable in some of them to omit electrolytic treatment and to rely entirely on a chemical etchant.

In either case, clean-up etching begins by inserting a suitably formed and mounted semiconductor unit 11 (FIGURE 1) into chamber 43 (FIGURE 2), after suitable adjustment of nozzle units 13, 14. Next, the etchant, air and suction pumps 59, 69, 71 (FIGURE 3) are started, etchant valve 66 is opened, and a column of etchant is thus applied to each electrode and surrounding area 17, 21 (FIGURE 1), in proper direction and under proper pneumatic control by air cushions 23, as has been described. After a suitable number of milliseconds, or multiples thereof, the etchant valve is closed, water pump 65 started and water inlet valve 67 opened (FIGURE 3), while suction continues to be applied, so that the wafer is now flooded by a relatively large body 75 of rinsing water, which removes all traces of the previously applied etchant, again within a few milliseconds. When thoroughly covered with water by such flooding, the semiconductor unit can be promptly and rapidly transferred by manipulation of holder 35, to a suitable storage zone, not shown, thus avoiding danger of recontamination.

It will be seen that, while the microscopic adjustment of jet column 19 (FIGURE 2) may require some skill, such is in no way comparable to the combined precision and endurance required in the former routines of clean-up etching by dipping. All other operations required according to the invention are so simple that they can readily be performed by relatively unskilled operators, or automatically by relatively simple equipment which need not be shown herein. The operations are also of unprecedented rapidity. Yet it has been found, in such operations hereunder, that transistors treated in accordance with the routines described herein are at least equal and often superior to transistors of generally identical design which have been subjected to the above-mentioned dipping treatment for clean-up etching, even if such had been done by the most highly skilled operators.

While only a single embodiment of the invention has been described, it should be understood that the details thereof are not to be construed as limitative of the invention, except insofar as is consistent with the scope of the following claim.

I claim:

In the fabrication of transistors each having electrodes on opposite surfaces thereof, "recombination" zones around said electrodes, and a "base" zone narrowly spaced from the "recombination" zones and secured to a conductive "base" element: forming at least one column of flowing liquid, adapted to etch contaminants from said "recombination" zones, in such a way as to avoid spray action but to permit evaporation of liquid portions on the surface of said liquid column; obliquely directing said column of flowing liquid against one of said surfaces in such a way as to contact an area including the "recombination" zone and not the "base" zone; and controlling mist formed by said evaporation of liquid portions and surrounding said column, by directing a stream of dry gas over the semiconductor in a direction from over said "base" zone toward and beyond said "recombination" zone, while keeping said stream of gas sufficiently gentle to entrain only the evaporated mist and substantially not to affect the column of flowing liquid.

References Cited in the file of this patent

UNITED STATES PATENTS

| | | |
|---|---|---|
| 1,345,219 | Nicholas | June 29, 1920 |
| 2,088,542 | Westin | July 27, 1937 |
| 2,139,640 | Mall et al. | Dec. 6, 1938 |
| 2,242,032 | Houk | May 13, 1941 |
| 2,261,988 | Gaebel | Nov. 11, 1941 |
| 2,523,018 | Henderson | Sept. 19, 1950 |
| 2,744,000 | Seiler | May 1, 1956 |
| 2,767,137 | Evers | Oct. 16, 1956 |
| 2,780,569 | Hewlett | Feb. 5, 1957 |
| 2,799,637 | Williams | July 16, 1957 |
| 2,840,885 | Cressell | July 1, 1958 |
| 2,849,341 | Jenny | Aug. 26, 1958 |
| 2,937,124 | Vaughan | May 17, 1960 |

FOREIGN PATENTS

| | | |
|---|---|---|
| 1,153,749 | France | Oct. 14, 1957 |